(12) United States Patent
Yamaguchi et al.

(10) Patent No.: US 11,422,064 B2
(45) Date of Patent: Aug. 23, 2022

(54) CONTROL APPARATUS DESIGN METHOD, CONTROL APPARATUS, AND AXIAL TORQUE CONTROL APPARATUS

(71) Applicants: MEIDENSHA CORPORATION, Tokyo (JP); NATIONAL UNIVERSITY CORPORATION CHIBA UNIVERSITY, Chiba (JP)

(72) Inventors: Takashi Yamaguchi, Tokyo (JP); Kang-Zhi Liu, Chiba (JP)

(73) Assignees: MEIDENSHA CORPORATION, Tokyo (JP); NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 0 days.

(21) Appl. No.: 17/282,668

(22) PCT Filed: Aug. 1, 2019

(86) PCT No.: PCT/JP2019/030368
§ 371 (c)(1),
(2) Date: Apr. 2, 2021

(87) PCT Pub. No.: WO2020/070963
PCT Pub. Date: Apr. 9, 2020

(65) Prior Publication Data
US 2021/0341355 A1 Nov. 4, 2021

(30) Foreign Application Priority Data
Oct. 2, 2018 (JP) .............................. JP2018-187160

(51) Int. Cl.
*G05B 17/02* (2006.01)
*G01M 15/02* (2006.01)
(Continued)

(52) U.S. Cl.
CPC ............... *G01M 15/02* (2013.01); *G01L 3/10* (2013.01); *G01L 5/26* (2013.01); *G05B 17/02* (2013.01)

(58) Field of Classification Search
CPC . G01L 3/10; G01L 5/26; G01M 15/02; G05B 17/02
See application file for complete search history.

(56) References Cited

U.S. PATENT DOCUMENTS

| 2004/0225383 A1 | 11/2004 | Tsai et al. |
| 2010/0251811 A1 | 10/2010 | Akiyama et al. |
(Continued)

FOREIGN PATENT DOCUMENTS

| JP | 2009-133714 A | 6/2009 |
| JP | 2012-113676 A | 6/2012 |
| WO | 2018016628 A1 | 1/2018 |

OTHER PUBLICATIONS

Sakamoto, Noboru et al., γ-Passive System and Its Phase Property and Synthesis, IEEE Transactions on Automatic Control, Jun. 1996, vol. 41, No. 6, pp. 859-865.
(Continued)

*Primary Examiner* — Eric S. McCall
(74) *Attorney, Agent, or Firm* — Muncy, Geissler, Olds & Lowe, P.C.

(57) ABSTRACT

In this control apparatus design method, a feedback control system comprises a generalization plant including a nominal plant N representing the input/output characteristic of an object to be controlled and a fluctuation unit Δ for making at least one model parameter included in the nominal plant N fluctuate, and a controller for applying input to the generalization plant P on the basis of output from the generalization plant P. The controller is designed so as to satisfy a prescribed design condition. The nominal plant N comprises a nominal value multiplication unit for multiply- (Continued)

ing an input signal $\eta$ by a nominal value for the model parameter and an addition unit for adding a fluctuation output signal $\xi$ from the fluctuation unit $\Delta$ and an output signal from the nominal value multiplication unit. Further, the fluctuation unit $\Delta$ generates the fluctuation output signal $\xi$ using a mapping $\Delta p$ obtained from a Cayley transform of unbounded complex fluctuation $\Delta g$.

20 Claims, 14 Drawing Sheets

(51) Int. Cl.
*G01L 3/10* (2006.01)
*G01L 5/26* (2006.01)

(56) References Cited

U.S. PATENT DOCUMENTS

| | | |
|---|---|---|
| 2019/0278237 A1 | 9/2019 | Akiyama et al. |
| 2021/0341355 A1* | 11/2021 | Yamaguchi .......... G01M 13/025 |
| 2022/0065750 A1* | 3/2022 | Akiyama .............. G01M 13/02 |
| 2022/0143823 A1* | 5/2022 | Yoshida .............. G01M 17/007 |
| 2022/0145398 A1* | 5/2022 | Yu ......................... C12Q 1/686 |

OTHER PUBLICATIONS

International Search Report (with English translation) and Written Opinion dated Oct. 15, 2019 issued in corresponding international Application No. PCT/JP2019/030368.

\* cited by examiner

CONTROL APPARATUS DESIGN METHOD, CONTROL APPARATUS, AND AXIAL TORQUE CONTROL APPARATUS

TECHNICAL FIELD

The present invention relates to a control apparatus design method, a control apparatus, and a shaft torque control apparatus.

BACKGROUND ART

An engine bench system measures various characteristics of an engine by connecting the engine which is a test piece to a dynamometer via a connection shaft, and controlling the throttle opening of the engine by a throttle actuator while using the dynamometer as a power absorber for the engine. Provided on the connection shaft is a shaft torque meter that detects shaft torque, which is torsional torque of the connection shaft. When the dynamometer is used as a power absorber, shaft torque control for causing this shaft torque to match a predetermined shaft torque command is performed. Patent Document 1 describes a design method for a shaft torque control apparatus in accordance with I-PD control. In an engine bench system, resonance may occur in the connection shaft due to pulsating torque generated in the engine. Accordingly, in the design method of Patent Document 1, the characteristics of the engine bench system are represented by a two-inertia system transfer function, and the frequency of the pole of a fourth-order closed-loop transfer function obtained by connecting this transfer function and an I-PD control device is designated as approximately the mechanical resonant frequency of the engine bench system to thereby set a gain parameter used in I-PD control. In accordance with the design method of Patent Document 1, it is possible to design a shaft torque control apparatus that is capable of shaft torque control with a resonance suppression effect.

Patent Document 1: Japanese Unexamined Patent Application, Publication No. 2009-133714

DISCLOSURE OF THE INVENTION

Problems to be Solved by the Invention

However, in a typical engine bench system, the connection shaft that connects the engine and the dynamometer includes a clutch having a characteristic in that the spring rigidity thereof fluctuates greatly. By the shaft torque control apparatus in Patent Document 1, stable control is possible even if the spring rigidity of the connection shaft fluctuates. However, in the design method of Patent Document 1, the gain parameter is set while using as a reference the mechanical resonant frequency for when the spring rigidity is low. Accordingly, only a conservative result can be obtained with the design method in Patent Document 1, and a shaft torque control apparatus designed thereby has low control responsiveness.

An object of the present invention is to provide a control apparatus design method capable of designing while designating a fluctuation range for a parameter that characterizes an input/output characteristic for a control target as positive, and provide a shaft torque control apparatus and a control apparatus designed in accordance with this control apparatus design method.

Means for Solving the Problems (1) A control apparatus design method according to the present invention is a method for, in a feedback control system (for example, a feedback control system 8 described below) provided with a generalized plant (for example, a generalized plant P described below) that includes a nominal plant (for example, a nominal plant N described below) representing an input/output characteristic for a control target and a fluctuation unit (for example, a fluctuation unit Δ described below) that provides fluctuation for at least one model parameter included in the nominal plant and a control apparatus (for example, a controller K or a shaft torque control apparatus 7 that are described below) that provides an input to the generalized plant based on an output from the generalized plant, designing a control apparatus so that a predetermined design condition is satisfied, in which the nominal plant is provided with a nominal value multiplication unit (for example, a nominal value multiplication unit 51 described below) that multiplies a predetermined input signal by a nominal value for the at least one model parameter and an addition unit (for example, an addition unit 52 described below) that adds a fluctuation output signal from the fluctuation unit together with an output signal from the nominal value multiplication unit, and the fluctuation unit generates the fluctuation output signal by using a mapping (for example, a mapping Δp described below) in accordance with a Cayley transform of complex fluctuation (for example, complex fluctuation Δg described below).

(2) In this case, it is desirable that the fluctuation unit is provided with a bounded fluctuation generation unit (for example, a bounded fluctuation generation unit 61 described below) that generates a bounded fluctuation signal by multiplying a predetermined input signal by the mapping, a phase adjustment unit (for example, a phase adjustment unit 62 described below) that uses a phase adjustment transfer function (for example, a phase adjustment transfer function $W_{scope}(s)$ described below) to cause the phase of the fluctuation signal to change, and a normalization unit (for example, a normalization unit 63 described below) that uses an output signal from the phase adjustment unit and the input signal for the nominal value multiplication unit to limit a norm of the fluctuation output signal to within a predetermined range.

(3) In this case, it is desirable that the method includes setting the phase adjustment transfer function so that a transfer function (for example, a transfer function M(s) described below) that takes the fluctuation signal and gives the input signal for the bounded fluctuation generation unit is a positive real function (for example, step S2 of FIG. 8 described below), and designing the control apparatus so that a design condition is satisfied (for example, step S3 of FIG. 8 described below).

(4) It is desirable that the phase adjustment transfer function is set in accordance with a metaheuristic algorithm.

(5) In this case, it is desirable that the nominal plant is constructed based on a multi-inertia system configured by connecting two or more inertial bodies, each characterized by a predetermined moment of inertia, in series by one or more shaft bodies each characterized by a predetermined spring rigidity and a predetermined damping coefficient, and the at least one model parameter is at least one of the moment of inertia of one of the two or more inertial bodies, the spring rigidity of one of the one or more shaft bodies, and the damping coefficient of one of the one or more shaft bodies.

(6) In this case, it is desirable that the control target is a test system (for example, a test system S described below) provided with a test piece (for example, an engine E described below) that generates torque in response to a test piece input, a dynamometer (for example, a dynamometer 2 described below) that generates torque in response to a torque current command signal, a connection shaft (for example, a connection shaft 3 described below) that connects the test piece and the dynamometer, and a shaft torque meter (for example, a shaft torque meter 5 described below) that generates a shaft torque detection signal in response to shaft torque for the connection shaft, the nominal plant is constructed based on a multi-inertia system configured by connecting two or more inertial bodies in series by one or more shaft bodies each characterized by a predetermined spring rigidity, the at least one model parameter is the spring rigidity, and the control apparatus is a shaft torque control apparatus that outputs a torque current command signal upon being inputted with the shaft torque detection signal and a shaft torque command signal with respect to the shaft torque detection signal.

Effects of the Invention (1) A conventional robust control design method such as $H_\infty$ control or μ design defines a feedback control system that prescribes, for example, a fluctuation unit that provides unbounded complex fluctuation for a model parameter included in a generalized plant or a nominal plant, and imposes, as a design condition, a sufficient condition relating to robust stability derived based on the small-gain theorem on this feedback control system to thereby design a control apparatus that can satisfy this design condition (for example, refer to Kang-Zhi LIU, "Linear robust control", Corona Publishing, Co., Ltd., 2002). In this fashion, the conventional robust control design method handles unbounded complex fluctuation, but this corresponds to considering the fluctuation range of the model parameter up to infinity by design on an imaginary number axis, and is not realistic. In contrast to this, the control apparatus design method according to the present invention provides additive fluctuation for a model parameter of a nominal plant in accordance with a fluctuation output signal outputted from a fluctuation unit, and generates a fluctuation output signal by using a mapping in accordance with a Cayley transform of complex fluctuation in the fluctuation unit. By means of the Cayley transform, unbounded complex fluctuation, which extends across the right half-plane of the complex plane, is mapped to within a unit circle. Accordingly, by virtue of the control apparatus design method of the present invention, because it is possible to use bounded complex fluctuation obtained by a Cayley transform as the fluctuation output signal, it is possible to design a control apparatus while designating the range of fluctuation of the model parameter as positive.

(2) In the control apparatus design method according to the present invention, fluctuation is provided for the model parameter by using the fluctuation unit, which is provided with a bounded fluctuation generation unit that generates a bounded fluctuation signal by multiplying a predetermined input signal by the mapping in accordance with a Cayley transform, a phase adjustment unit that uses a phase adjustment transfer function to cause the phase of the fluctuation signal to change, and a normalization unit that uses an output signal from the phase adjustment unit and an input signal for an nominal value multiplication unit to restrict a norm of the fluctuation output signal to within a predetermined range. By virtue of the control apparatus design method according to the present invention, when the upper limit and lower limit of the range of fluctuation of the model parameter is determined in advance, it is possible to design a control apparatus that conforms to reality by using the upper limit and the lower limit to restrict the norm of the fluctuation output signal in the normalization unit to within a defined range.

(3) In the control apparatus design method according to the present invention, the control apparatus is designed after, in the generalized plant that includes the fluctuation unit and the nominal plant, setting, by a computer, the phase adjustment transfer function in the phase adjustment unit so that a transfer function, which takes the bounded fluctuation signal which is the output from the bounded fluctuation generation unit and gives the input signal for the bounded fluctuation generation unit, becomes a positive real function; and designing the control apparatus by a computer in order to satisfy a design condition. By virtue of the control apparatus design method according to the present invention, it is possible to design a control apparatus that can achieve stable and high-response control by setting the phase adjustment transfer function so that the transfer function, which takes the fluctuation signal and gives the input signal, becomes a positive real function.

(4) In the control apparatus design method according to the present invention, the phase adjustment transfer function is set in accordance with a metaheuristic algorithm so that the transfer function, which takes the fluctuation signal and gives the input signal, becomes a positive real function. As a result, it is possible to quickly set the phase adjustment transfer function regardless of the skill of the designer.

(5) In the control apparatus design method according to the present invention, the nominal plant is constructed based on a multi-inertia system configured by connecting two or more inertial bodies in series by one or more shaft bodies, at least one of the moment of inertia of one of the inertial bodies, the spring rigidity of the one or more shaft bodies, and the damping coefficient of the one or more shaft bodies is set as the model parameter to be provided with fluctuation by the fluctuation unit, and a control apparatus that sets the multi-inertia system as a control target is designed. As a result, it is possible to design a control apparatus that can achieve stable and high-response control even when the moment of inertia, spring rigidity, damping coefficient, and the like fluctuate.

(6) In the control apparatus design method according to the present invention, a test system that is provided with a test piece that generates torque in response to a test piece input, a dynamometer that generates torque in response to the torque current command signal, a connection shaft that connects the test piece and the dynamometer, and a shaft torque meter that generates a shaft torque detection signal in accordance with shaft torque at the connection shaft is set as the control target, a multi-inertia system configured by connecting two inertial bodies in series by one or more shaft bodies is set as the nominal plant, the spring rigidity of the one or more shaft bodies of the multi-inertia system is set as the model parameter to provide fluctuation for in accordance with the fluctuation unit, and a control apparatus that outputs the torque current command signal in response to the shaft torque detection signal and a shaft torque command signal is designed. The connection shaft that connects the test piece and the dynamometer as described above includes a clutch and has a characteristic in that the spring rigidity thereof greatly fluctuates. With respect to this, by virtue of the control apparatus design method according to the present invention, it is possible to design a control apparatus for the test system that can achieve stable and high-response control.

PREFERRED MODE FOR CARRYING OUT THE INVENTION

Figure 1:
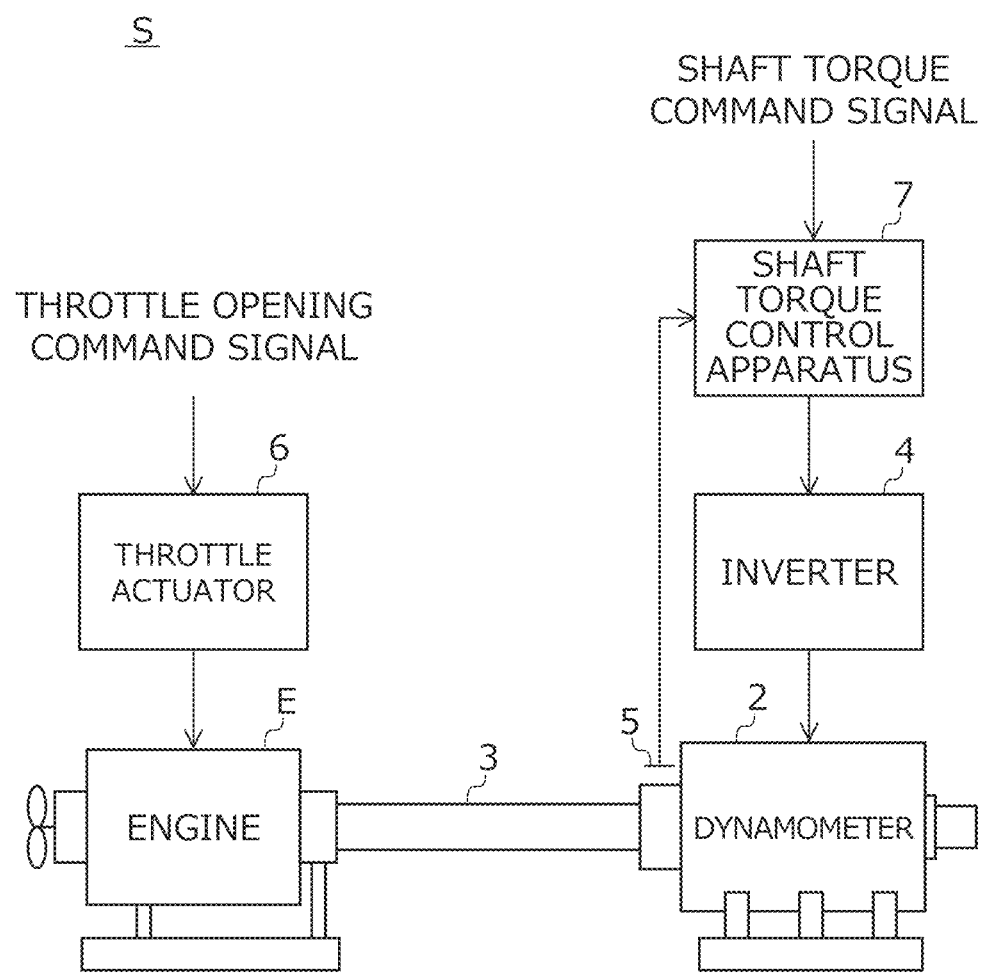
FIG. 1 is a view that illustrates a configuration of a test system installed with a shaft torque control apparatus designed by applying a control apparatus design method according to an embodiment of the present invention.

With reference to the drawings, description is given in detail below regarding an embodiment of the present invention. FIG. 1 is a view that illustrates a configuration of a test system S installed with a shaft torque control apparatus 7 designed by applying a control apparatus design method according to the present embodiment. The test system S is provided with an engine E that is a test piece, a dynamometer 2, a connection shaft 3, an inverter 4, a shaft torque meter 5, a throttle actuator 6, and the shaft torque control apparatus 7. The test system S is a so-called engine bench system that measures various characteristics of the engine E by using the dynamometer 2 as a power absorber for the engine E while controlling the throttle opening of the engine E by the throttle actuator 6.

The throttle actuator 6, upon being inputted with a throttle opening command signal corresponding to a command with respect to throttle opening of the engine E, controls the throttle opening of the engine E to achieve the command, and thereby generates engine torque in accordance with the throttle opening command signal at the engine E.

Figure 2:
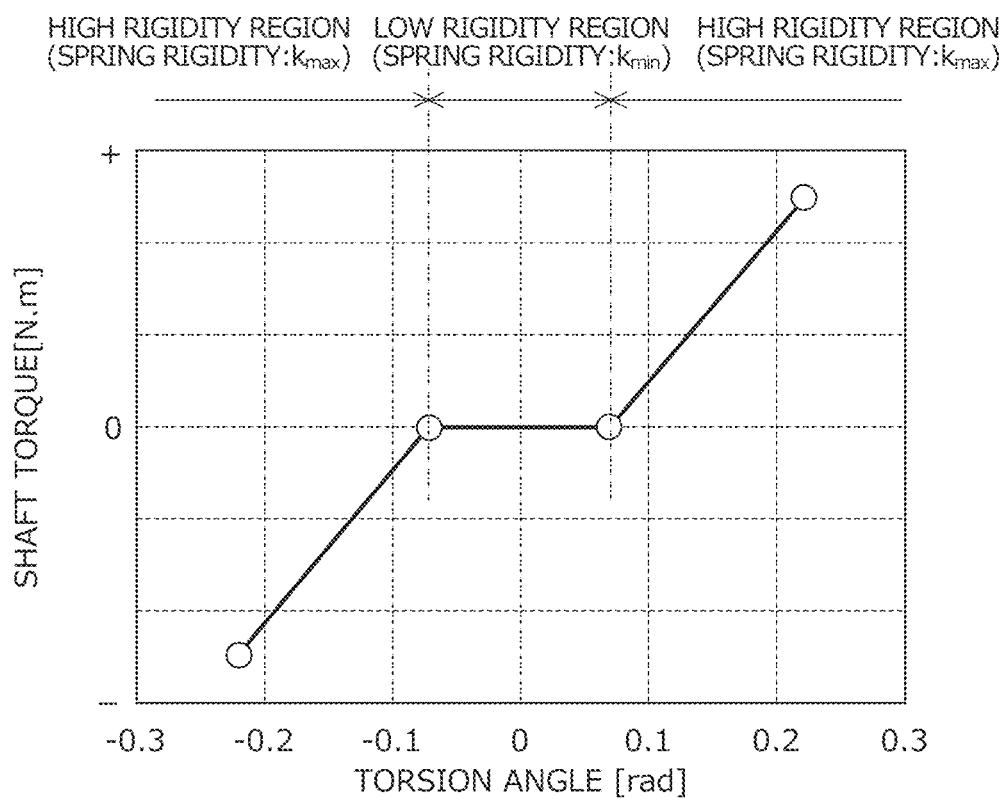
FIG. 2 is a view that illustrates an example of a relationship between shaft torque and a torsion angle of a connection shaft.

The connection shaft 3 connects the output shaft of the engine E to the output shaft of the dynamometer 2. The connection shaft 3 includes a clutch, and therefore has a characteristic that the spring rigidity thereof fluctuates within a predetermined range. FIG. 2 is a view that illustrates an example of a relationship between shaft torque (Nm) and a torsion angle (rad) of the connection shaft. In FIG. 2, the slope corresponds to the spring rigidity. As illustrated in FIG. 2, the spring rigidity of the connection shaft has a characteristic of being low in a low rigidity region that includes where the torsion angle is 0 (rad), and increasing in high rigidity regions that are outside this low rigidity region. In other words, in the example of FIG. 2, a lower limit $k_{min}$ of a range of fluctuation in spring rigidity corresponds to the spring rigidity in a state where the connection shaft is in the low rigidity region, and an upper limit $k_{max}$ corresponds to the spring rigidity in a state where the connection shaft is in a high rigidity region.

Returning to FIG. 1, the shaft torque meter 5 generates a shaft torque detection signal in accordance with shaft torque at the connection shaft 3, and transmits the shaft torque detection signal to the shaft torque control apparatus 7. In order for shaft torque control deviation, which is the difference between a predetermined shaft torque command signal and the shaft torque detection signal from the shaft torque meter 5, to not disappear, the shaft torque control apparatus 7 uses the shaft torque command signal and the shaft torque detection signal to thereby generate a torque current command signal corresponding to a command with respect to torque to be generated at the dynamometer 2, and inputs the torque current command signal to the inverter 4. The inverter 4 supplies the dynamometer 2 with electric power in accordance with the torque current command signal inputted from the shaft torque control apparatus 7, and thereby generates dynamo torque in accordance with the torque current command signal at the dynamometer 2.

Figure 3:
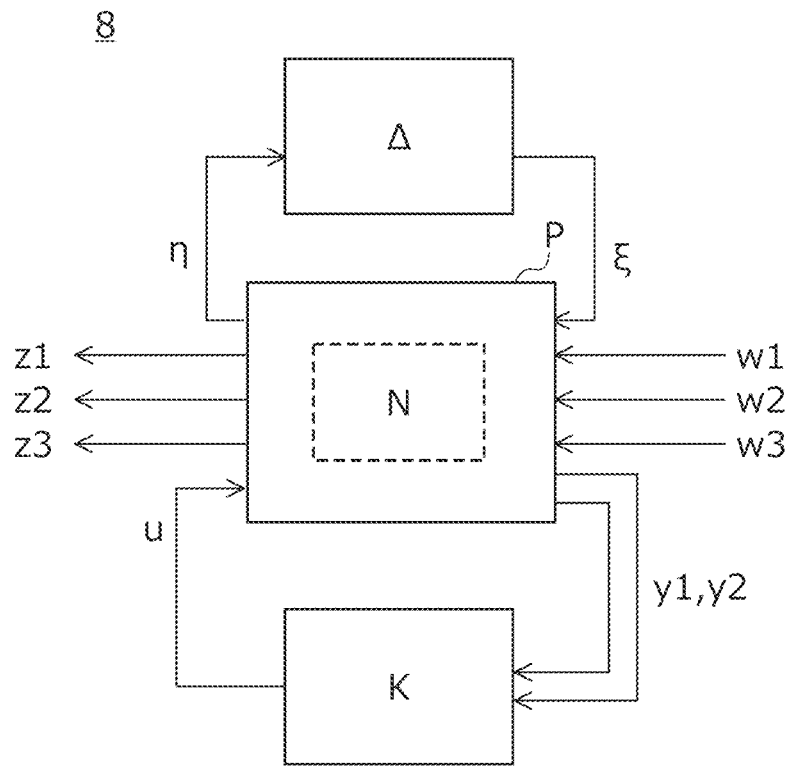
FIG. 3 is a view that illustrates a configuration of a feedback control system used when designing a shaft torque control apparatus.

The shaft torque control apparatus 7, which performs shaft torque control as above, defines a feedback control system 8 as illustrated in FIG. 3, and is configured by installing a controller, which is designed so that predetermined design conditions in this feedback control system 8 are satisfied, in hardware provided with input and output ports such as a digital signal processor or a microcomputer.

In the test system S configured as above, when the shaft torque control apparatus 7, in which a later-described controller K is installed, is inputted with a shaft torque command signal transmitted via communication from a higher-level controller (not illustrated) and the shaft torque detection signal transmitted from the shaft torque meter 5 which is equipped in the dynamometer 2, the shaft torque control apparatus 7 generates the torque current command signal and inputs the torque current command signal to the inverter 4 via communication. When the inverter 4, which is electrically connected to the dynamometer 2, is inputted with the torque current command signal from the shaft torque control apparatus 7, the inverter 4 causes the dynamometer 2 to generate torque in accordance with the torque current command signal. Disturbance elements envisioned at this time include noise generated when measuring shaft torque in the shaft torque meter 5 and deviation in non-linearity between generated torque and the torque current command signal due to, for example, the control response of the inverter 4 or time delay in each communication path. The shaft torque command signal described above may be generated by a higher-level controller that is separate from the shaft torque control apparatus 7 as described above, and may be generated by a module constructed separately from the controller K inside the shaft torque control apparatus 7.

The feedback control system 8 of FIG. 3 is configured by combining a generalized plant P having a nominal plant N that represents an input/output characteristic for the test system S from input to the engine E and input to the dynamometer 2 to output from the shaft torque meter 5, the controller K that provides inputs to and receives outputs from this generalized plant P, and a fluctuation unit Δ that provides fluctuation for the nominal plant N.

Defined in the generalized plant P are inputs made up of a first disturbance input w1, a second disturbance input w2, and a third disturbance input w3, and outputs made up of a first evaluation output z1, a second evaluation output z2, and a third evaluation output z3. Below, a vector quantity having the first disturbance input w1, the second disturbance input w2, and the third disturbance input w3 as components is referred to as w, and a vector quantity having the first evaluation output z1, the second evaluation output z2, and the third evaluation output z3 as components is referred to as z. A specific configuration of the generalized plant P is described in detail below with reference to FIG. 5 and FIG. 6.

Figure 4:
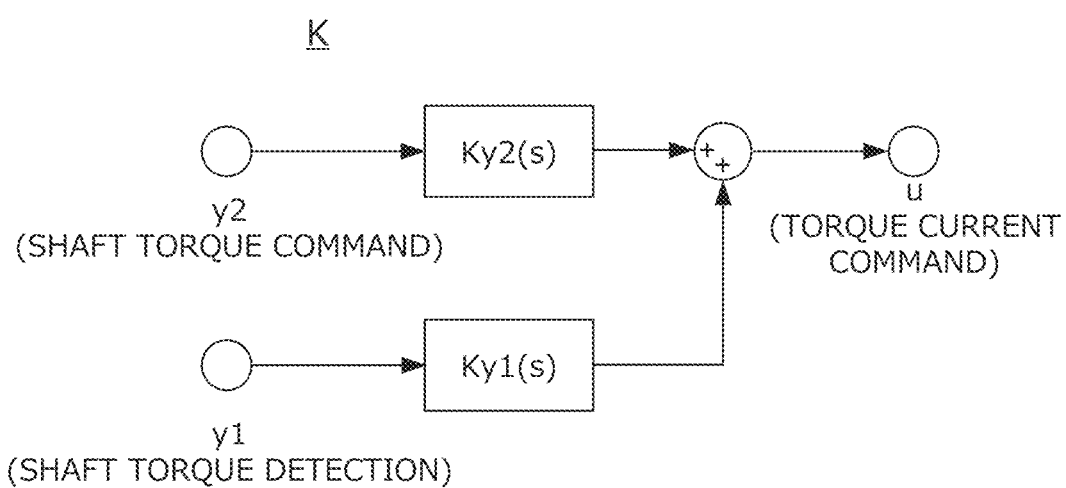
FIG. 4 is a view that illustrates a configuration of a controller derived based on the feedback control system of FIG. 3.

In addition, a first observation output y1 that corresponds to the shaft torque detection signal, a second observation output y2 that corresponds to the shaft torque command signal, and a control input u that corresponds to the torque current command signal are defined between the generalized plant P and the controller K. By setting input/output signals as above between the generalized plant P and the controller K, the controller K, which is for a two-degrees-of-freedom control system that is configured by combining two transfer functions Ky1(s) and Ky2(s) and that outputs the control input u from the first observation output y1 and the second observation output y2, is derived as illustrated in FIG. 4.

Returning to FIG. 3, a fluctuation input η that is a scalar quantity and a fluctuation output ξ that is a scalar quantity are defined between the generalized plant P and the fluctuation unit Δ. The fluctuation unit Δ generates the fluctuation output ξ based on the fluctuation input η outputted from the generalized plant P, and provides this fluctuation output ξ to the generalized plant P to provide fluctuation for the nominal plant N. A specific configuration of the fluctuation unit Δ is described in detail later with reference to FIG. 6.

Figure 5:
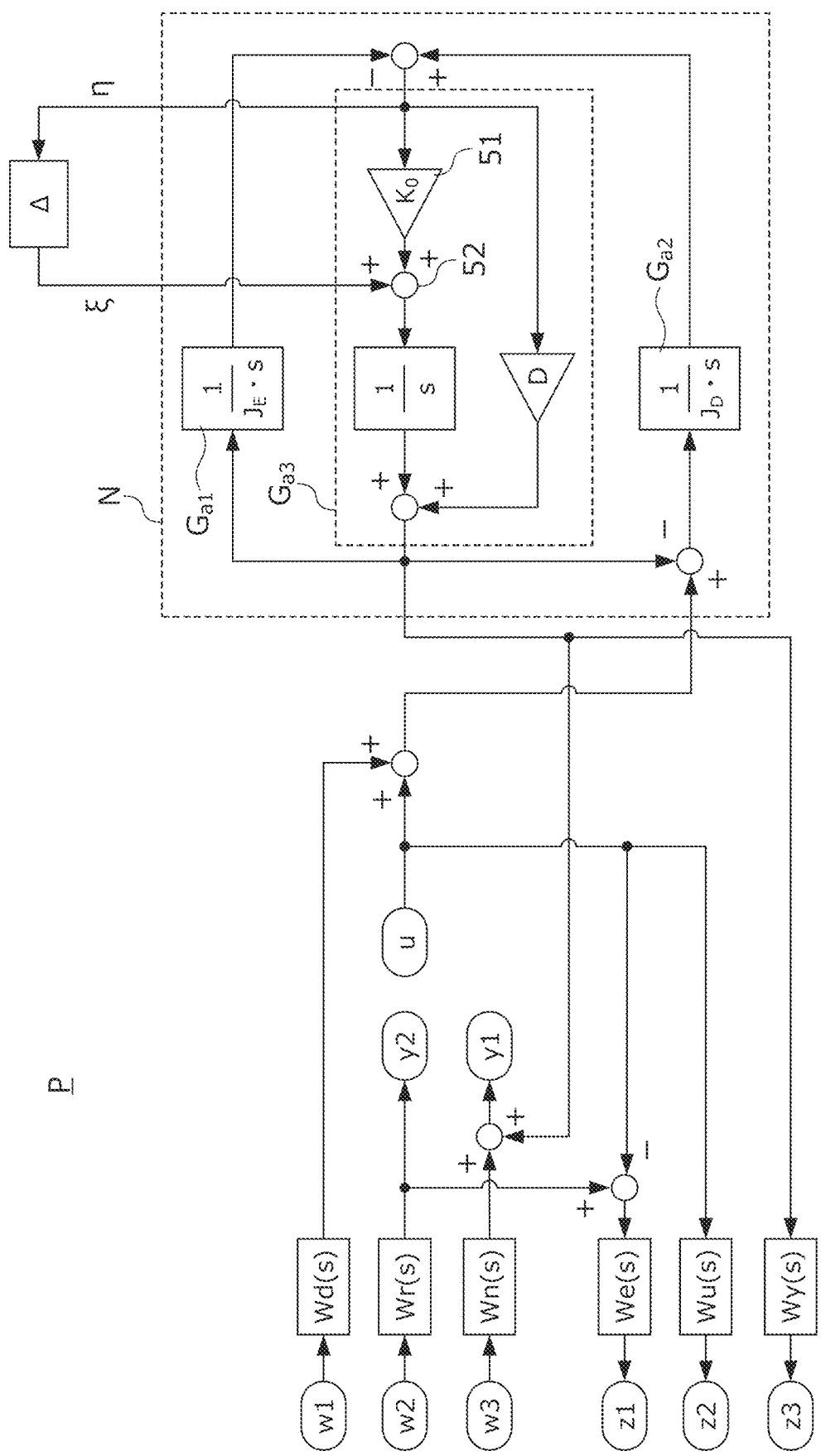
FIG. 5 is a view that illustrates a configuration of a generalized plant.

FIG. 5 is a view that illustrates a configuration of the generalized plant P. The generalized plant P is configured by combining the nominal plant N which represents the input/output characteristic for the test system S which is to be controlled, the fluctuation unit Δ which provides fluctuation for at least one model parameter included in the nominal plant N, and a plurality of weight functions: We(s), Wu(s), Wy(s), Wd(s), Wr(s), and Wn(s).

In the test system S of FIG. 1, the nominal plant N is provided with an input/output characteristic that represents an input/output characteristic that takes dynamo torque in accordance with the torque current command signal and gives shaft torque in accordance with the shaft torque detection signal.

The nominal plant N is, for example, constructed based on the equations of motion of a two-inertia system configured by connecting a first inertial body having a moment of inertia $J_E$ of the engine E and a second inertial body having a moment of inertia $J_D$ of the dynamometer 2 by a shaft having a predetermined damping coefficient D and spring rigidity with a predetermined nominal value $k_0$. The nominal plant N is configured by combining, as illustrated in FIG. 5, a transfer function $G_{a1}(s)$ (refer to the following equation (1-1)) that takes the sum of engine torque (not illustrated) and shaft torque and gives the rotation speed (engine rotation speed) of a first inertial body that corresponds to the engine, a transfer function $G_{a2}(s)$ (refer to the following equation (1-2)) that takes the difference between dynamo torque and shaft torque and gives the rotation speed (dynamo rotation speed) of a second inertial body that corresponds to the dynamometer, and a transfer function $G_{a3}(s)$ (refer to the following equation (1-3)) that takes the difference between the engine rotation speed and the dynamo rotation speed and gives the shaft torque.

$$G_{a1}(s) = \frac{1}{J_E \cdot s} \quad (1\text{-}1)$$

$$G_{a2}(s) = \frac{1}{J_D \cdot s} \quad (1\text{-}2)$$

$$G_{a3}(s) = D + \frac{k_0}{s} \quad (1\text{-}3)$$

In the nominal plant N configured by combining the three transfer functions, the moment of inertia of the engine E and the moment of inertia for the dynamometer 2, which are each obtained by known methods, are used for the moment of inertia $J_E$ and the moment of inertia $J_D$. A predefined positive value is used for the damping coefficient D of the shaft. The nominal value $k_0$ for the spring rigidity of the shaft is defined as the lower limit $k_{min}$ of the range of fluctuation envisioned for spring rigidity of the connection shaft 3 used in the test system S ($k_0 = k_{min}$). Here, the lower limit $k_{min}$ of the fluctuation range for spring rigidity is the value of spring rigidity when the connection shaft is in the low rigidity region in the example of FIG. 2.

Four model parameters as above are defined in the nominal plant N: the moment of inertia of the engine, the moment of inertia of the dynamometer, the damping coefficient of the connection shaft, and the spring rigidity of the connection shaft. The fluctuation unit Δ provides fluctuation for spring rigidity, which is one of these four model parameters. More specifically, the nominal plant N is provided with a nominal value multiplication unit 51 that multiplies the spring rigidity nominal value $k_0$ by the input signal η which corresponds to the rotational speed of the connection shaft, and an addition unit 52 that adds an output signal from the nominal value multiplication unit 51 together with the fluctuation output signal ξ which is the output signal from the fluctuation unit Δ. When the input signal η is inputted to the nominal value multiplication unit 51, the fluctuation unit Δ generates the fluctuation output signal ξ, and inputs the fluctuation output signal ξ to the addition unit 52. As a result, the fluctuation unit Δ provides additive fluctuation for the spring rigidity which is a model parameter of the nominal plant N.

The generalized plant P of FIG. 5 is defined by a plurality of input and output signals that include the first disturbance input w1, the second disturbance input w2, the third disturbance input w3, the first evaluation output z1, the second evaluation output z2, the third evaluation output z3, the control input u, the first observation output y1, the second observation output y2, the fluctuation input η, and the fluctuation output ξ. The correspondence between these input and output signals and the test system S of FIG. 1 is as follows.

The first disturbance input w1 is a signal that is inputted to the generalized plant P, and corresponds to disturbance with respect to the control input u that is outputted from the controller K. The first disturbance input w1 is weighted by the weight function Wd(s) which is set in advance. The second disturbance input w2 is a signal that is inputted to the generalized plant P, and corresponds to disturbance with respect to the shaft torque command signal that is inputted to the controller K. The second disturbance input w2 is weighted by the weight function Wr(s) which is set in advance. The third disturbance input w3 is a signal that is inputted to the generalized plant P, and corresponds to a disturbance with respect to the shaft torque detection signal that is inputted to the controller K. The third disturbance input w3 is weighted by the weight function Wn(s) which is set in advance.

The control input u is a signal that is inputted to the generalized plant P from the controller K, and corresponds to the torque current command signal. A result of adding the control input u and the first disturbance input w1 weighted by the weight function Wd(s) is inputted to the nominal plant N. The first observation output y1 is a signal that is inputted to the controller K from the generalized plant P, and corresponds to the shaft torque detection signal. A result of adding the output from the nominal plant N together with the third disturbance input w3 weighted by the weight function Wn(s) is used for the first observation output y1. The second observation output y2 is a signal that is inputted to the controller K, and corresponds to the shaft torque command signal. A result of weighting the second disturbance input w2 by the weight function Wr(s) is used for the second observation output y2.

The first evaluation output z1 is a signal that is outputted from the generalized plant P, and corresponds to weighted shaft torque control deviation. A result of weighting, by the weight function We(s) which is set in advance, a deviation obtained by subtracting the control input u which corresponds to the torque current command signal from the second observation output y2 which corresponds to the shaft torque command signal is used for the first evaluation output z1. The second evaluation output z2 is a signal that is outputted from the generalized plant P, and corresponds to a weighted torque current command signal. A result of weighting, by the weight function Wu(s) which is set in advance, the control input u which corresponds to the torque current command signal as described above is used for the second evaluation output z2. The third evaluation output z3 is a signal that is outputted from the generalized plant P, and corresponds to a weighted shaft torque detection signal. A result of weighting an output from the nominal plant N by the weight function Wy(s) which is set in advance is used for the third evaluation output z3.

Figure 6:
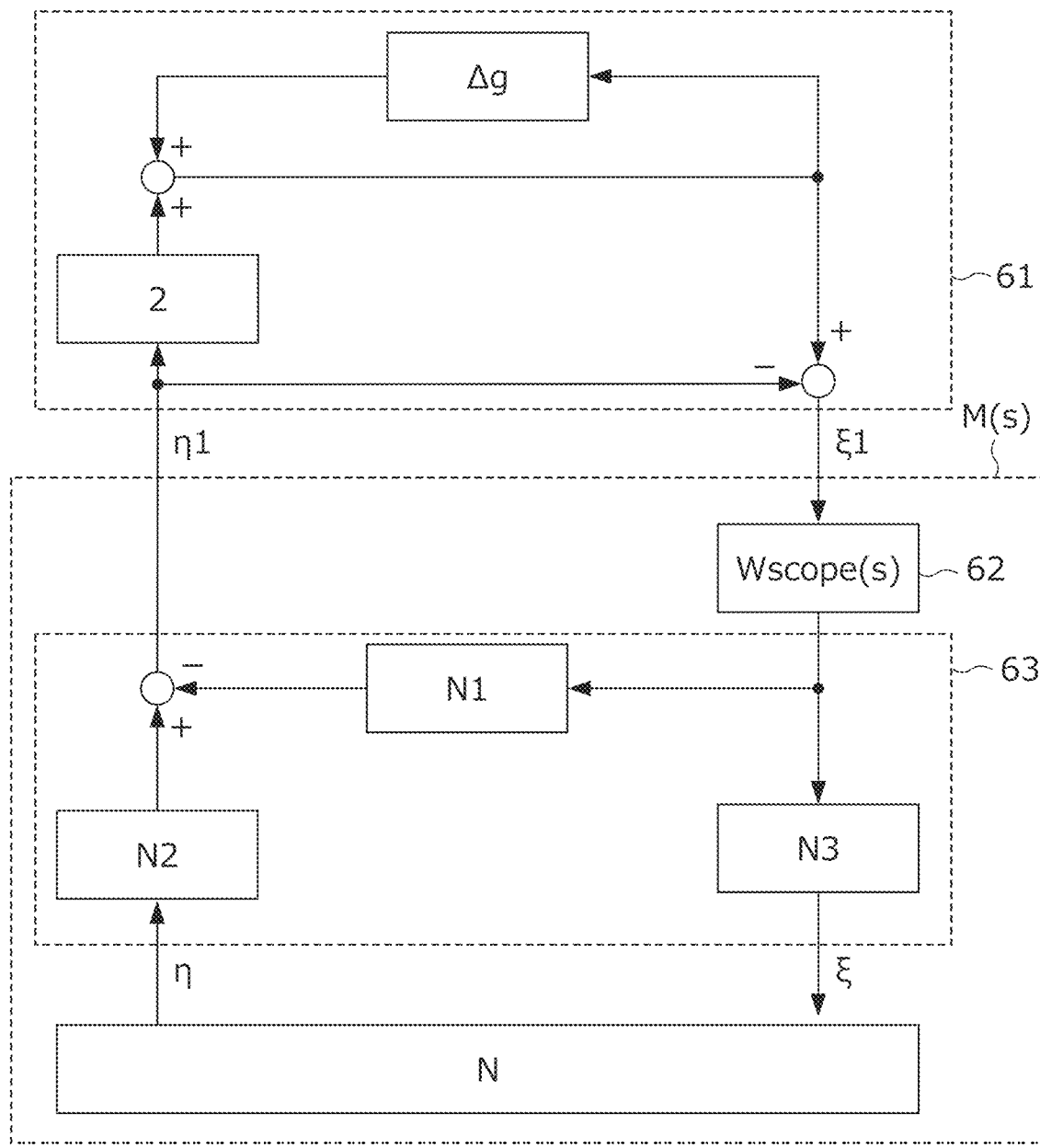
FIG. 6 is a view that illustrates a configuration of a fluctuation unit.

FIG. 6 is a view that illustrates a configuration of the fluctuation unit $\Delta$. The fluctuation unit $\Delta$ is provided with a bounded fluctuation generation unit 61, a phase adjustment unit 62, and a normalization unit 63. The fluctuation unit $\Delta$ uses these to thereby generate the fluctuation output signal $\xi$ from the input signal $\eta$ that is inputted from the nominal plant N, and inputs the fluctuation output signal $\xi$ to the nominal plant N.

Figure 7:
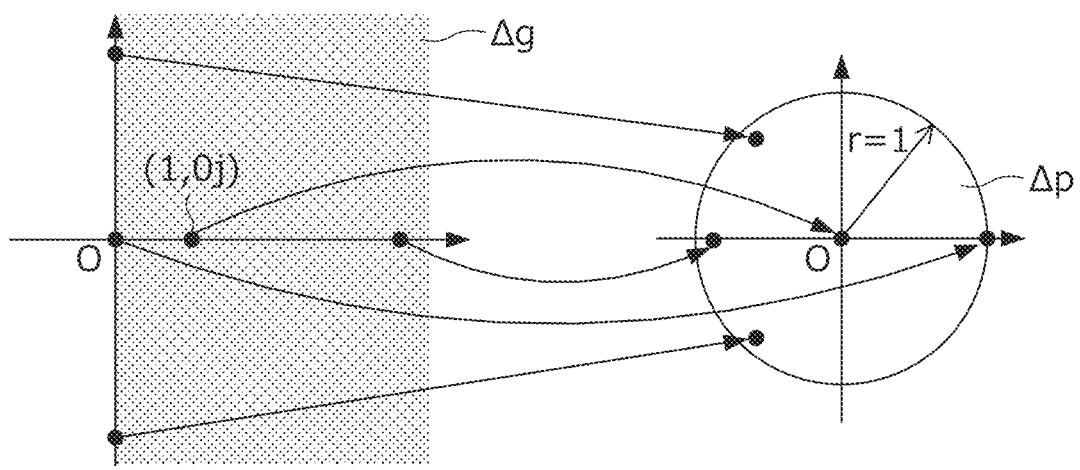
FIG. 7 is a view that illustrates a mapping in accordance with a Cayley transform of complex fluctuation.

The bounded fluctuation generation unit 61 generates a bounded fluctuation signal $\xi 1$ by multiplying an input signal $\eta 1$ inputted from the normalization unit 63 by a mapping in accordance with a Cayley transform of unbounded complex fluctuation $\Delta g$, and outputs the bounded fluctuation signal $\xi 1$ to the phase adjustment unit 62. More specifically, the bounded fluctuation generation unit 61 generates the fluctuation signal $\xi 1$ by multiplying the input signal $\eta 1$ by a mapping $\Delta p$ in accordance with a Cayley transform of the complex fluctuation $\Delta g$, as indicated by the following equation (2). According to the Cayley transform indicated in the following equation (2), the unbounded complex fluctuation $\Delta g$, which extends across the right half-plane of the complex plane, is mapped to within a unit circle of which the origin is the center and the radius is 1, as illustrated in FIG. 7.

$$\xi 1 = \Delta p \cdot \eta 1 = \left(-1 + \frac{2}{1 - \Delta g}\right) \cdot \eta 1 \qquad (2)$$

The phase adjustment unit 62 causes the phase of the fluctuation signal $\xi 1$ to change by multiplying the bounded fluctuation signal $\xi 1$ generated by the bounded fluctuation generation unit 61 by a predetermined phase adjustment transfer function $W_{scope}(s)$. As described later with reference to FIG. 8, the functional form of the phase adjustment transfer function $W_{scope}(s)$ is set so that a transfer function M(s), which takes the fluctuation signal $\xi 1$ outputted from the bounded fluctuation generation unit 61 and gives the input signal $\eta 1$ which is inputted to the bounded fluctuation generation unit 61, is a positive real function. When the following inequality (3) is established for the transfer function M(s), the transfer function M(s) is defined as being a positive real function. M*(s) is the complex conjugate of M(s).

$$M^*(j\omega) + M(j\omega) \geq 0 \quad \forall \omega \in [0, \infty] \qquad (3)$$

The normalization unit 63 uses the output signal from the phase adjustment unit 62 and the input signal $\eta$ inputted from the nominal plant N to limit a norm of the fluctuation output signal $\xi$ outputted from the fluctuation unit $\Delta$ to within a predetermined range. The normalization unit 63 inputs the bounded fluctuation generation unit 61 with the signal $\eta 1$, which is obtained by subtracting a result of multiplying the output signal from the phase adjustment unit 62 by a predetermined first norm N1 from a result of multiplying the input signal $\eta$ by a predetermined second norm N2, generates the fluctuation output signal $\xi$ by multiplying the output signal from the phase adjustment unit 62 by a predetermined third norm N3, and inputs the fluctuation output signal $\xi$ to the nominal plant N. Here each of the norms N1, N2, and N3 is set as indicated in the following equations (4), for example. As a result, the norm of the fluctuation output signal $\xi$ generated by the fluctuation unit $\Delta$ is limited to the range of 0 to $k_{max} - k_{min}$.

$$N1 = 1, N2 = \sqrt{k_{max} - k_{min}}, N3 = \sqrt{k_{max} - k_{min}} \qquad (4)$$

Figure 8:
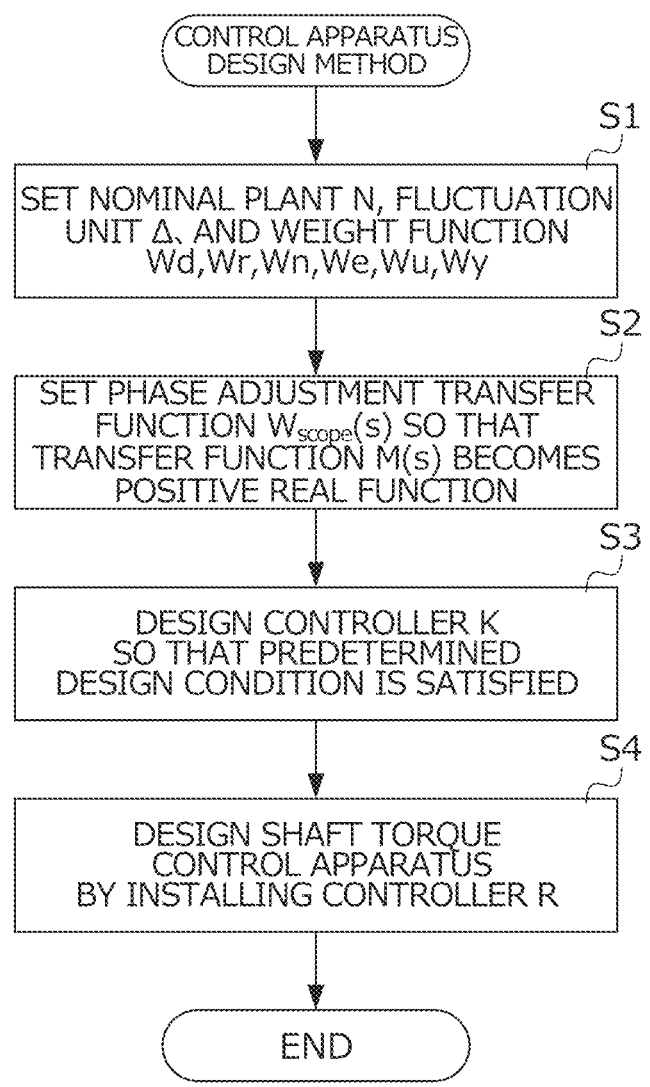
FIG. 8 is a flow chart that illustrates a specific procedure for the control apparatus design method.

FIG. 8 is a flow chart that illustrates a specific procedure for a control apparatus design method according to the present embodiment.

Firstly, in step S1, the nominal plant N, the fluctuation unit $\Delta$, and the weight functions Wd(s), Wr(s), Wn(s), We(s), Wu(s), and Wy(s) as illustrated in FIG. 5 and FIG. 6 are set by using a computer.

Next, in step S2, the computer is used to thereby design the phase adjustment transfer function $W_{scope}(s)$ so that the transfer function M(s), which takes the fluctuation signal $\xi 1$ outputted from the bounded fluctuation generation unit 61 of the fluctuation unit $\Delta$ and gives the input signal $\eta 1$ which is inputted to the bounded fluctuation generation unit 61, becomes a positive real function. More specifically, a known metaheuristic algorithm such as a genetic algorithm or particle swarm optimization is used in order to design the phase adjustment transfer function $W_{scope}(s)$ so that the transfer function $M(s)$ is a positive real function.

Next, in step S3, in the feedback control system 8 configured by combining the controller K and the generalized plant P constructed as above, the controller K is designed by the computer in order to satisfy a predetermined design condition that is defined so that robust stability is achieved. More specifically, such a controller K is derived by performing an iterative operation based on D-K iteration on the computer, for example.

Next, in step S4, the shaft torque control apparatus 7 is designed by installing the controller K designed in step S3 in a digital signal processor.

Next, description is given regarding the effect of the shaft torque control apparatus 7 designed by the control apparatus design method as above, with reference to FIG. 9 to FIG. 14.

Figure 9:
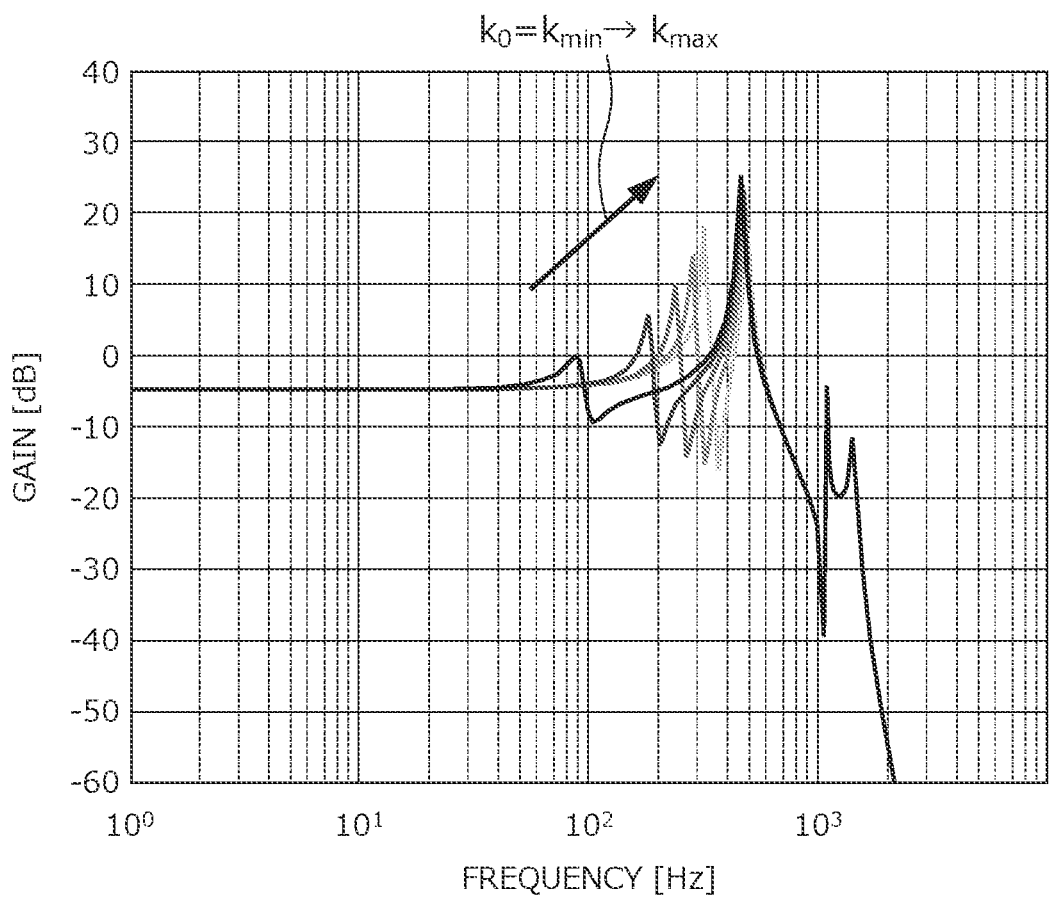
FIG. 9 is a view that illustrates an open loop characteristic of a plant configured by connecting the controller to a nominal plant.

FIG. 9 is a view that illustrates an open loop characteristic (takes shaft torque command signal and gives shaft torque detection signal) of the plant configured by connecting the controller K to the nominal plant N. FIG. 9 illustrates, by changing types of lines, the open loop characteristic for when the nominal value $k_0$ of the spring rigidity of the nominal plant N is caused to gradually change from $k_{min}$ to $k_{max}$. As illustrated in FIG. 9, a resonance phenomenon where the gain increases by a predetermined resonant frequency occurs in the test system S that connects the engine E and the dynamometer 2 by the connection shaft 3. This resonant frequency has a characteristic of increasing the greater spring rigidity of the connection shaft 3.

Figure 10:
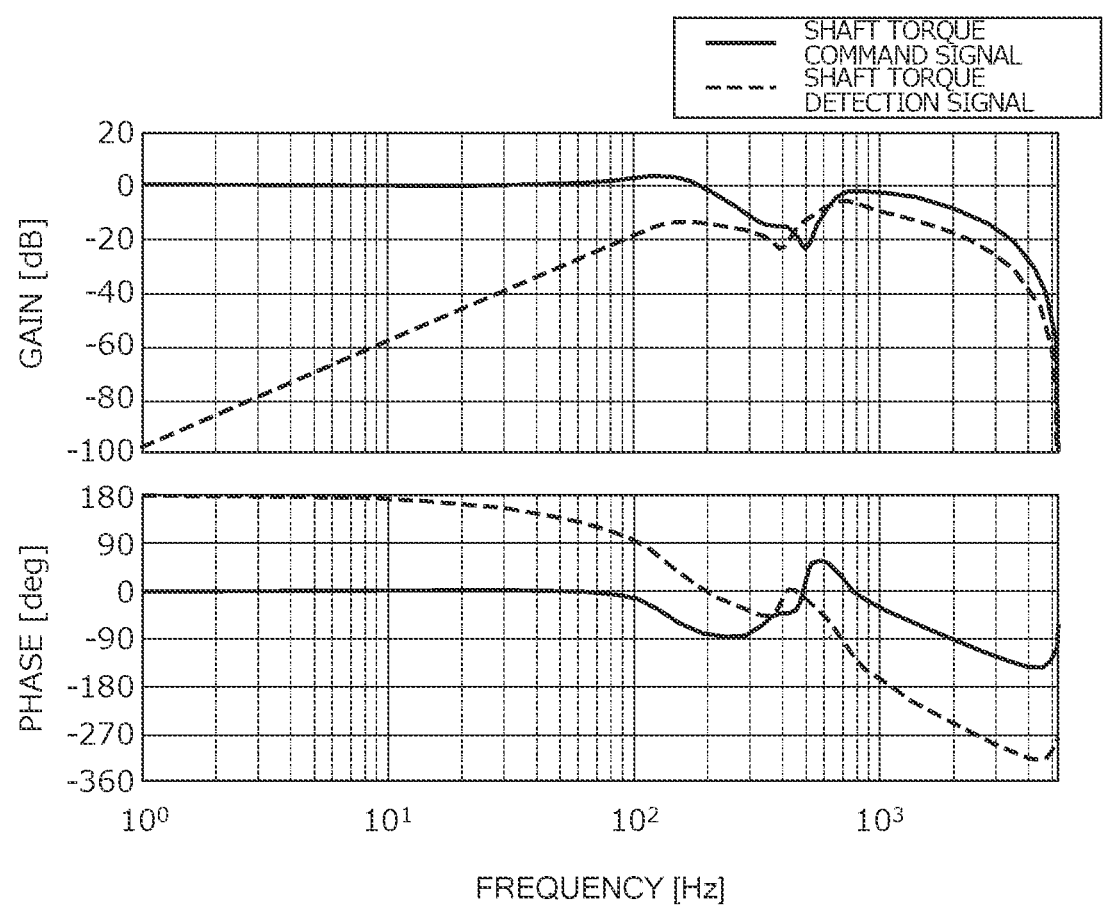
FIG. 10 is a view that illustrates a characteristic of a shaft torque control apparatus designed in accordance with the control apparatus design method of FIG. 8.

FIG. 10 is a view that illustrates a frequency response characteristic of the shaft torque control apparatus 7 designed in accordance with the control apparatus design method of FIG. 8. FIG. 10 illustrates the frequency response by the shaft torque control apparatus 7 with respect to the shaft torque command signal by a solid line, and illustrates the frequency response by the shaft torque control apparatus 7 with respect to the shaft torque detection signal by a broken line. As illustrated in FIG. 10, shaft torque control for which control deviation between the input and output of the controller does not occur is achieved by the shaft torque control apparatus 7 in a low range that is separated from the resonance point at approximately 100 to 500 (Hz).

Figure 11:
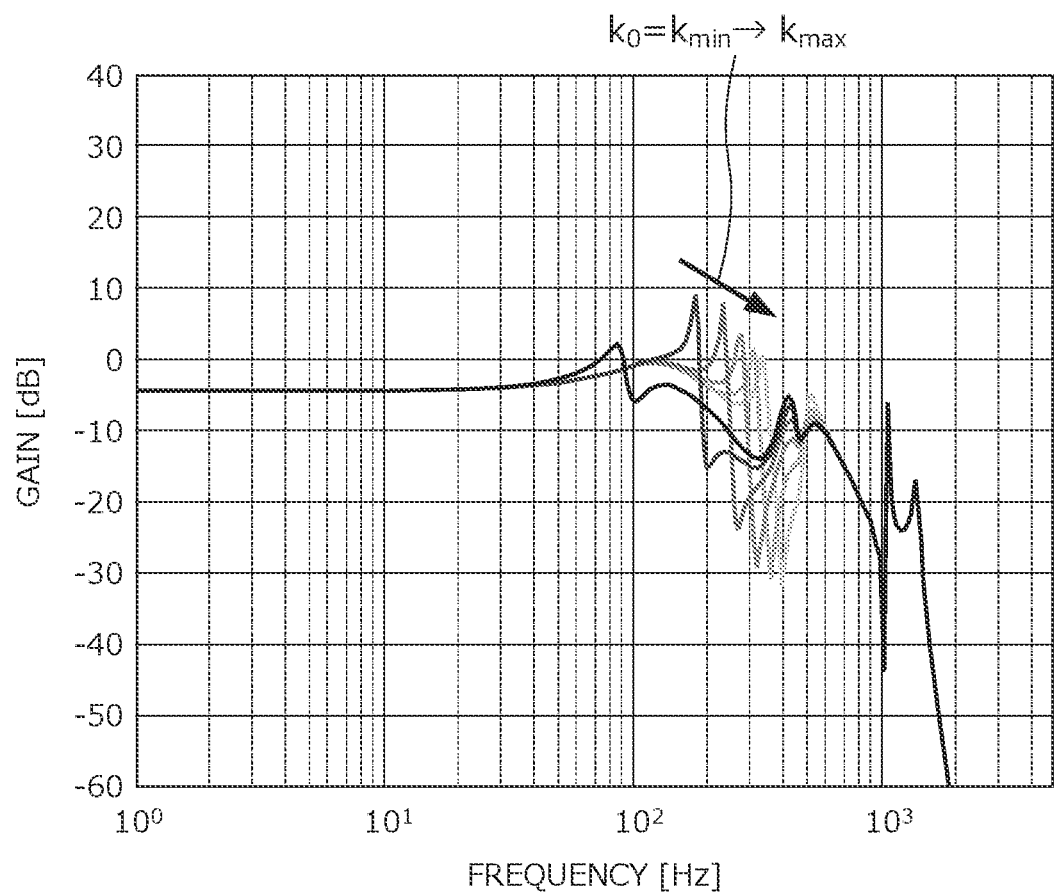
FIG. 11 is a view that illustrates a closed loop characteristic (taking a shaft torque command signal and giving a shaft torque detection signal) when shaft torque control using the shaft torque control apparatus is performed.
Figure 12:
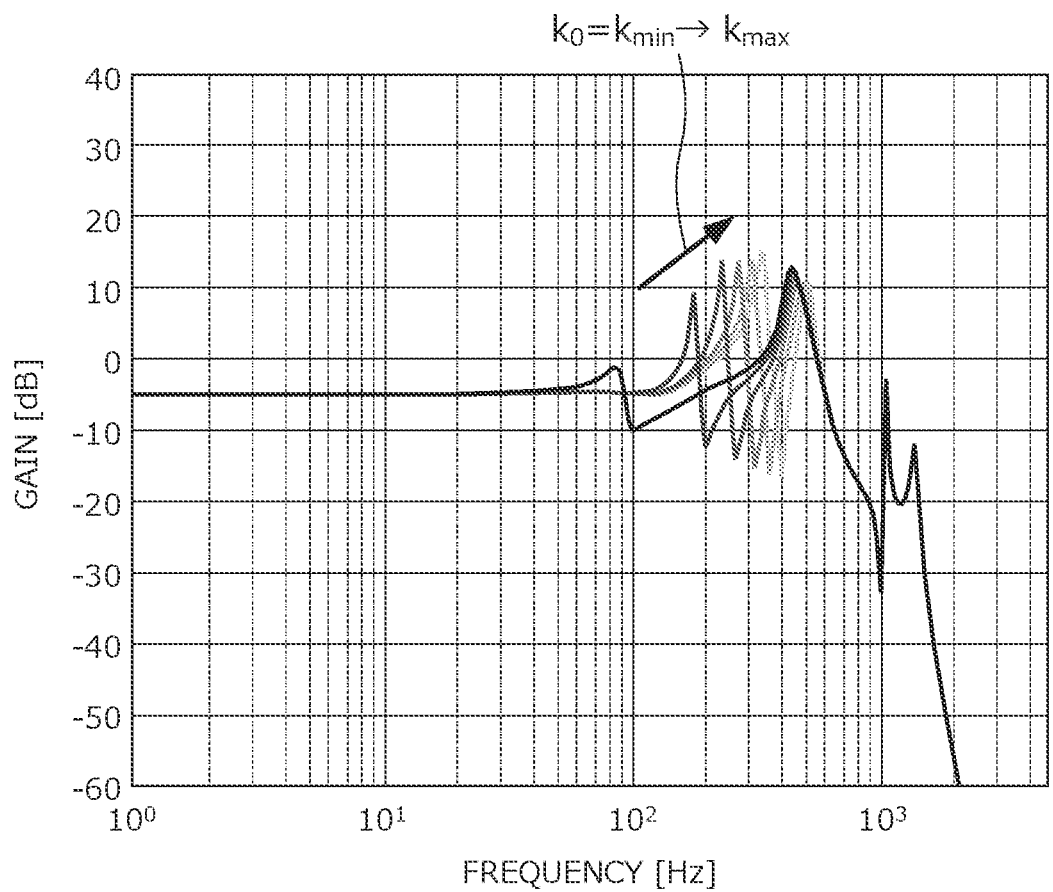
FIG. 12 is a view that illustrates a closed loop characteristic (taking disturbance with respect to a shaft torque command signal and giving a shaft torque detection signal) when shaft torque control using the shaft torque control apparatus is performed.
Figure 13:
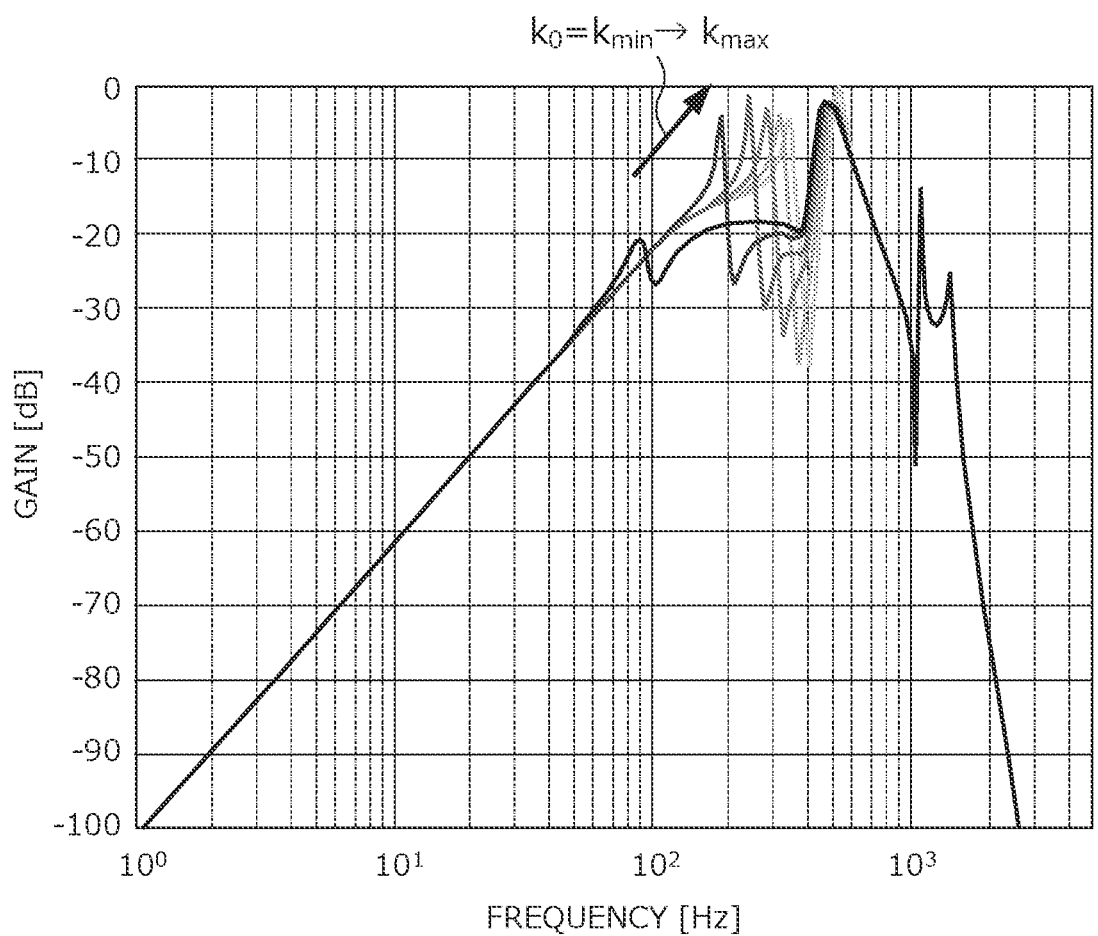
FIG. 13 is a view that illustrates a closed loop characteristic (taking noise from a shaft torque meter and giving a shaft torque detection signal) when shaft torque control using the shaft torque control apparatus is performed.
Figure 14:
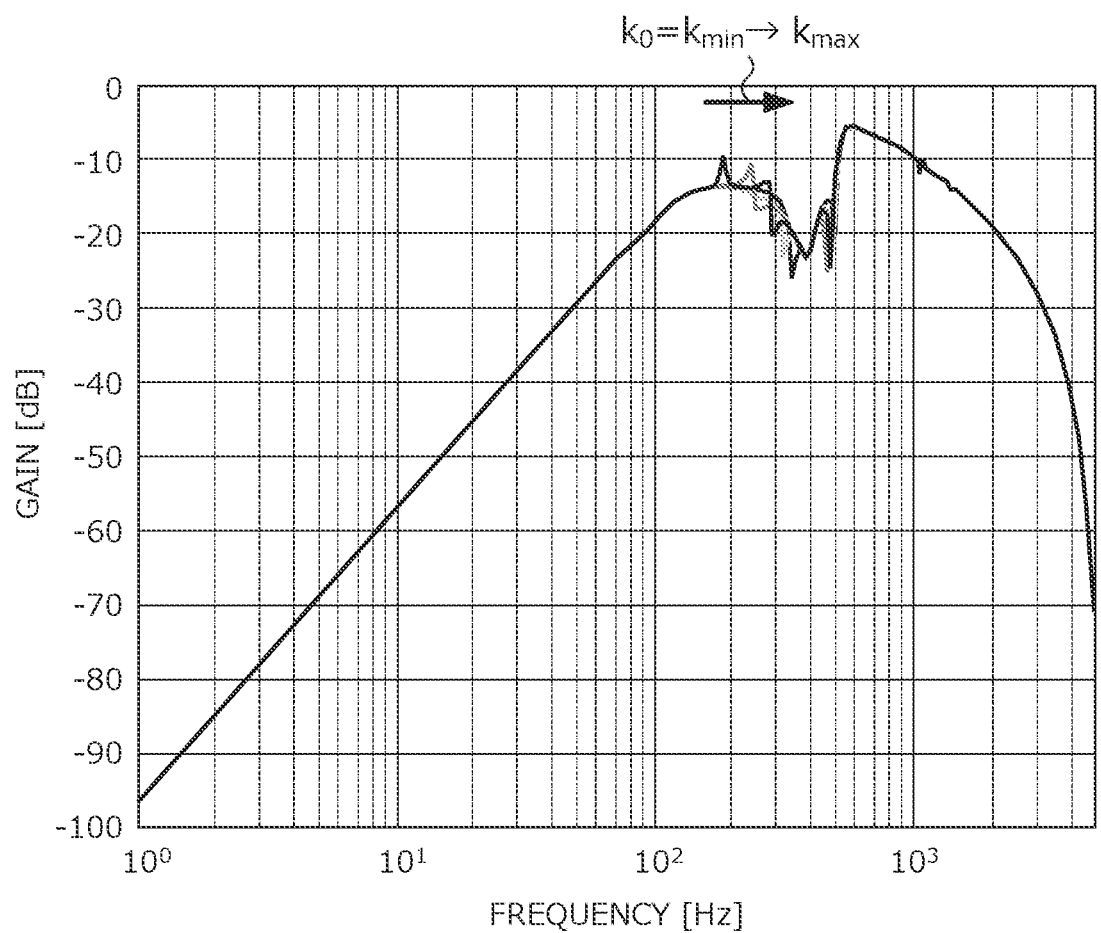
FIG. 14 is a view that illustrates a closed loop characteristic (taking noise from the shaft torque meter and giving a torque current command signal) when shaft torque control using the shaft torque control apparatus is performed.

FIG. 11 to FIG. 14 are views that illustrate closed loop characteristics when shaft torque control using the shaft torque control apparatus 7, which is provided with the frequency response characteristic illustrated in FIG. 10, is performed. FIG. 11 illustrates a transfer characteristic that takes the shaft torque command signal and gives the shaft torque detection signal. FIG. 12 illustrates a transfer characteristic that takes disturbance with respect to the shaft torque command signal and gives the shaft torque detection signal. FIG. 13 illustrates a transfer characteristic that takes noise from the shaft torque meter 5 and gives the shaft torque detection signal. FIG. 14 illustrates a transfer characteristic that takes noise from the shaft torque meter 5 and gives the torque current command signal.

As clarified by comparing FIG. 11 and FIG. 12 with FIG. 9, while the resonance peak gain was approximately 20 dB in FIG. 9, the gain is suppressed to less than or equal to 10 dB with any spring rigidity in the range of $k_{min}$ to $k_{max}$ in accordance with the examples of FIG. 11 and FIG. 12. In addition, as illustrated by FIG. 13 and FIG. 14, the influence of noise in the shaft torque meter 5 is entirely suppressed to less than or equal to 0 dB, and there is no case of the noise being amplified by feedback. As described above, by virtue of the shaft torque control apparatus 7 designed in accordance with the control apparatus design method illustrated in FIG. 8 based on the generalized plant P for which the nominal plant N and fluctuation unit Δ described with reference to FIG. 5 and FIG. 6 are defined, even if spring rigidity changes in the range of $k_{min}$ to $k_{max}$, it is possible to achieve shaft torque control having robust stability in this spring rigidity fluctuation range.

By virtue of the control apparatus design method according to the present embodiment, the following effects are achieved.

(1) In the control apparatus design method according to the present embodiment, additive fluctuation is provided for spring rigidity which is a model parameter of the nominal plant N in accordance with the fluctuation output signal ξ outputted from the fluctuation unit Δ, and the fluctuation output signal ξ is generated in the fluctuation unit Δ by using the mapping Δp in accordance with a Cayley transform of unbounded complex fluctuation Δg. By the Cayley transform, the unbounded complex fluctuation Δg, which extends across the right half-plane of the complex plane, is mapped to within a unit circle. Accordingly, by virtue of the control apparatus design method, because it is possible to use bounded complex fluctuation obtained by a Cayley transform as the fluctuation output signal ξ, it is possible to design the shaft torque control apparatus 7 while designating the range of fluctuation of spring rigidity as positive.

(2) In the control apparatus design method according to the present embodiment, fluctuation is provided for spring rigidity by using the fluctuation unit Δ, which is provided with the bounded fluctuation generation unit 61 that generates the bounded fluctuation signal ξ1 by multiplying the predetermined input signal η1 by the mapping Δp in accordance with a Cayley transform, the phase adjustment unit 62 that uses the phase adjustment transfer function $W_{scope}(s)$ to cause the phase of the fluctuation signal ξ1 to change, and the normalization unit 63 that uses the output signal from the phase adjustment unit 62 and the input signal η for the nominal value multiplication unit 51 to restrict a norm of the fluctuation output signal ξ to within a predetermined range. By virtue of the control apparatus design method, when the upper limit and lower limit of the range of fluctuation of spring rigidity is determined in advance, it is possible to design the shaft torque control apparatus 7 which conforms to reality by using the upper limit and the lower limit to restrict the norm of the fluctuation output signal ξ in the normalization unit 63 to within a defined range.

(3) In the control apparatus design method according to the present embodiment, the shaft torque control apparatus 7 is designed after, in the generalized plant P that includes the fluctuation unit Δ and the nominal plant N, setting (step S2 of FIG. 8), by a computer, the phase adjustment transfer function $W_{scope}(s)$ in the phase adjustment unit 62 so that the transfer function $M(s)$, which takes the bounded fluctuation signal ξ1 which is the output from the bounded fluctuation generation unit 61 and gives the input signal η1 for the bounded fluctuation generation unit 61, becomes a positive real function; and designing (step S3 of FIG. 8) the controller K by a computer in order to satisfy a predetermined design condition. By virtue of the control apparatus design method, it is possible to design the shaft torque control apparatus 7 that can achieve stable and high-response control by setting the phase adjustment transfer function $W_{scope}(s)$ so that the transfer function $M(s)$, which takes the fluctuation signal ξ1 and gives the input signal η1, becomes a positive real function.

(4) In the control apparatus design method according to the present embodiment, the phase adjustment transfer function $W_{scope}(s)$ is set in accordance with a metaheuristic algorithm so that the transfer function M(s), which takes the fluctuation signal $\xi 1$ and gives the input signal $\eta 1$, becomes a positive real function. As a result, it is possible to quickly set the phase adjustment transfer function $W_{scope}(s)$ regardless of the skill of the designer.

(5) In the control apparatus design method according to the present embodiment, the nominal plant N is constructed based on a two-inertia system configured by connecting in series two inertial bodies by one shaft body, fluctuation in accordance with the fluctuation unit $\Delta$ is provided for spring rigidity $k_0$ which is one of four model parameters of the nominal plant, and the shaft torque control apparatus 7 that takes the two-inertia system as a control target is designed. As a result, it is possible to design the shaft torque control apparatus 7 which can achieve stable and high-response control even when the spring rigidity fluctuates.

(6) In the control apparatus design method according to the present embodiment, the test system S that is provided with the engine E that generates torque in response to the throttle opening command signal, the dynamometer 2 that generates torque in response to the torque current command signal, the connection shaft 3 that connects the engine E and the dynamometer 2, and the shaft torque meter 5 that generates the shaft torque detection signal in accordance with shaft torque at the connection shaft 3 is set as the control target, a two-inertia system configured by connecting two inertial bodies in series by one or more shaft bodies is set as the nominal plant N, the spring rigidity $k_0$ of the one or more shaft bodies of the two-inertia system is set as the model parameter to provide fluctuation for in accordance with the fluctuation unit $\Delta$, and the shaft torque control apparatus 7 that outputs the torque current command signal in response to the shaft torque detection signal and the shaft torque command signal is designed. As described above, the connection shaft that connects the engine E and the dynamometer 2 includes a clutch and has a characteristic in that the spring rigidity $k_0$ thereof greatly fluctuates. With respect to this, by virtue of the control apparatus design method, it is possible to design the shaft torque control apparatus 7, for the test system S, which can achieve stable and high-response control.

Description is given above regarding one embodiment of the present invention, but the present invention is not limited to this. Detailed configurations may be appropriately changed within the scope of the spirit of the present invention.

For example, in the embodiment described above, description was given for the case where fluctuation is provided, by the fluctuation unit $\Delta$, for spring rigidity which is one of four model parameters defined in the nominal plant N, but the present invention is not limited to this. The number of model parameters for which fluctuation is provided by the fluctuation unit $\Delta$ is not limited to one and may be two or more. A model parameter for which fluctuation is provided by the fluctuation unit $\Delta$ may be the moment of inertia of the engine, the moment of inertia of the dynamometer, the damping coefficient of the connection shaft, or the like, in addition to the spring rigidity of the connection shaft.

Figure 15:
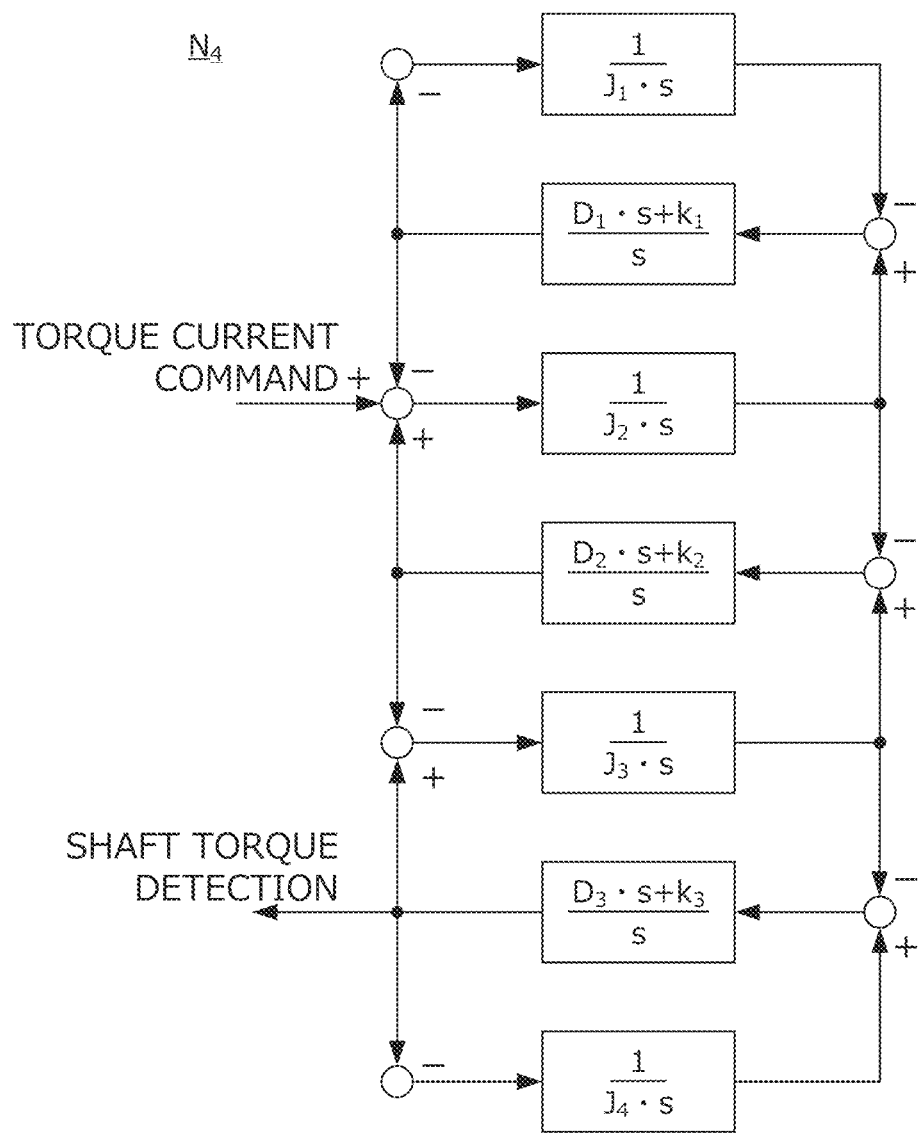
FIG. 15 is a view that illustrates another example of a nominal plant.

In addition, in the embodiment described above, description was given regarding a case in which the nominal plant N is constructed based on a two-inertia system configured by connecting in series two inertial bodies respectively characterized by the moments of inertia $J_E$ and $J_D$ by one shaft body characterized by the spring rigidity $k_0$ and the damping coefficient D, but the present invention is not limited to this. A nominal plant may be constructed based on a multi-inertia system configured by connecting two or more inertial bodies, each characterized by a predetermined moment of inertia, in series by one or more shaft bodies each characterized by a predetermined spring rigidity and a predetermined damping coefficient. FIG. 15 illustrates a case where a nominal plant N4 is constructed based on a four-inertia system configured by connecting in series four inertial bodies respectively characterized by moments of inertia $J_1$, $J_2$, $J_3$, and $J_4$ by three shaft bodies respectively characterized by spring rigidities $k_1$, $k_2$, and $k_3$ and damping coefficients $D_1$, $D_2$, and $D_3$.

EXPLANATION OF REFERENCE NUMERALS

P . . . Generalized plant
N . . . Nominal plant
51 . . . Nominal value multiplication unit
52 . . . Addition unit
$\Delta$ . . . Fluctuation unit
61 . . . Bounded fluctuation generation unit
62 . . . Phase adjustment unit
63 . . . Normalization unit
K . . . Controller
S . . . Test system
E . . . Engine (test piece)
2 . . . Dynamometer
3 . . . Connection shaft
5 . . . Shaft torque meter
7 . . . Shaft torque control apparatus

The invention claimed is:

1. A control apparatus design method for, in a feedback control system provided with a generalized plant that includes a nominal plant representing an input/output characteristic for a control target and a fluctuation unit that provides fluctuation for at least one model parameter included in the nominal plant and a control apparatus that provides an input to the generalized plant based on an output from the generalized plant, designing the control apparatus by a computer so that a predetermined design condition is satisfied, wherein
   the nominal plant is provided with a nominal value multiplication unit that multiplies a predetermined input signal by a nominal value for the at least one model parameter and an addition unit that adds a fluctuation output signal from the fluctuation unit together with an output signal from the nominal value multiplication unit, and
   the fluctuation unit generates the fluctuation output signal by using a mapping in accordance with a Cayley transform of complex fluctuation.

2. The control apparatus design method according to claim 1, wherein the fluctuation unit is provided with a bounded fluctuation generation unit that generates a bounded fluctuation signal by multiplying a predetermined input signal by the mapping, a phase adjustment unit that uses a phase adjustment transfer function to cause the phase of the fluctuation signal to change, and a normalization unit that uses an output signal from the phase adjustment unit and the input signal for the nominal value multiplication unit to limit a norm of the fluctuation output signal to within a predetermined range.

3. The control apparatus design method according to claim 2, comprising:
   setting the phase adjustment transfer function by the computer so that a transfer function that takes the fluctuation signal and gives the input signal for the bounded fluctuation generation unit is a positive real function, and designing the control apparatus by the computer so that the design condition is satisfied.

4. The control apparatus design method according to claim 3, wherein the phase adjustment transfer function is set in accordance with a metaheuristic algorithm.

5. The control apparatus design method according to claim 1, wherein the nominal plant is constructed based on a multi-inertia system configured by connecting two or more inertial bodies, each characterized by a predetermined moment of inertia, in series by one or more shaft bodies each characterized by a predetermined spring rigidity and a predetermined damping coefficient, and the at least one model parameter is at least one of the moment of inertia, the spring rigidity, and the damping coefficient.

6. The control apparatus design method according to claim 1, wherein the control target is a test system provided with a test piece that generates torque in response to a test piece input, a dynamometer that generates torque in response to a torque current command signal, a connection shaft that connects the test piece and the dynamometer, and a shaft torque meter that generates a shaft torque detection signal in response to shaft torque for the connection shaft, the nominal plant is constructed based on a multi-inertia system configured by connecting two or more inertial bodies in series by one or more shaft bodies each characterized by a predetermined spring rigidity and a predetermined damping coefficient, the at least one model parameter is the spring rigidity, and the control apparatus is a shaft torque control apparatus that outputs the torque current command signal upon being inputted with the shaft torque detection signal and a shaft torque command signal with respect to the shaft torque detection signal.

7. A control apparatus designed using the control apparatus design method according to claim 1.

8. A shaft torque control apparatus designed using the control apparatus design method according to claim 6.

9. The control apparatus design method according to claim 2, wherein the nominal plant is constructed based on a multi-inertia system configured by connecting two or more inertial bodies, each characterized by a predetermined moment of inertia, in series by one or more shaft bodies each characterized by a predetermined spring rigidity and a predetermined damping coefficient, and the at least one model parameter is at least one of the moment of inertia, the spring rigidity, and the damping coefficient.

10. The control apparatus design method according to claim 3, wherein the nominal plant is constructed based on a multi-inertia system configured by connecting two or more inertial bodies, each characterized by a predetermined moment of inertia, in series by one or more shaft bodies each characterized by a predetermined spring rigidity and a predetermined damping coefficient, and the at least one model parameter is at least one of the moment of inertia, the spring rigidity, and the damping coefficient.

11. The control apparatus design method according to claim 4, wherein the nominal plant is constructed based on a multi-inertia system configured by connecting two or more inertial bodies, each characterized by a predetermined moment of inertia, in series by one or more shaft bodies each characterized by a predetermined spring rigidity and a predetermined damping coefficient, and the at least one model parameter is at least one of the moment of inertia, the spring rigidity, and the damping coefficient.

12. The control apparatus design method according to claim 2, wherein the control target is a test system provided with a test piece that generates torque in response to a test piece input, a dynamometer that generates torque in response to a torque current command signal, a connection shaft that connects the test piece and the dynamometer, and a shaft torque meter that generates a shaft torque detection signal in response to shaft torque for the connection shaft, the nominal plant is constructed based on a multi-inertia system configured by connecting two or more inertial bodies in series by one or more shaft bodies each characterized by a predetermined spring rigidity and a predetermined damping coefficient, the at least one model parameter is the spring rigidity, and the control apparatus is a shaft torque control apparatus that outputs the torque current command signal upon being inputted with the shaft torque detection signal and a shaft torque command signal with respect to the shaft torque detection signal.

13. The control apparatus design method according to claim 3, wherein the control target is a test system provided with a test piece that generates torque in response to a test piece input, a dynamometer that generates torque in response to a torque current command signal, a connection shaft that connects the test piece and the dynamometer, and a shaft torque meter that generates a shaft torque detection signal in response to shaft torque for the connection shaft, the nominal plant is constructed based on a multi-inertia system configured by connecting two or more inertial bodies in series by one or more shaft bodies each characterized by a predetermined spring rigidity and a predetermined damping coefficient, the at least one model parameter is the spring rigidity, and the control apparatus is a shaft torque control apparatus that outputs the torque current command signal upon being inputted with the shaft torque detection signal and a shaft torque command signal with respect to the shaft torque detection signal.

14. The control apparatus design method according to claim 4, wherein the control target is a test system provided with a test piece that generates torque in response to a test piece input, a dynamometer that generates torque in response to a torque current command signal, a connection shaft that connects the test piece and the dynamometer, and a shaft torque meter that generates a shaft torque detection signal in response to shaft torque for the connection shaft, the nominal plant is constructed based on a multi-inertia system configured by connecting two or more inertial bodies in series by one or more shaft bodies each characterized by a predetermined spring rigidity and a predetermined damping coefficient, the at least one model parameter is the spring rigidity, and the control apparatus is a shaft torque control apparatus that outputs the torque current command signal upon being inputted with the shaft torque detection signal and a shaft torque command signal with respect to the shaft torque detection signal.

15. A control apparatus designed using the control apparatus design method according to claim 2.

16. A control apparatus designed using the control apparatus design method according to claim 3.

17. A control apparatus designed using the control apparatus design method according to claim 4.

18. A shaft torque control apparatus designed using the control apparatus design method according to claim 12.

19. A shaft torque control apparatus designed using the control apparatus design method according to claim 13.

20. A shaft torque control apparatus designed using the control apparatus design method according to claim 14.

* * * * *